United States Patent
Bennett et al.

(10) Patent No.: US 6,720,550 B2
(45) Date of Patent: Apr. 13, 2004

(54) SENSOR ASSEMBLY

(75) Inventors: Thomas E. Bennett, Danville, CA (US); Drew V. Nelson, San Carlos, CA (US)

(73) Assignee: Sandia National Laboratories, Livermore, CA (US)

(*) Notice: Subject to any disclaimer, the term of this patent is extended or adjusted under 35 U.S.C. 154(b) by 0 days.

(21) Appl. No.: 09/792,664

(22) Filed: Feb. 22, 2001

(65) Prior Publication Data

US 2001/0054682 A1 Dec. 27, 2001

Related U.S. Application Data

(63) Continuation-in-part of application No. 09/603,460, filed on Jun. 22, 2000.

(51) Int. Cl.[7] .................................................. G01J 1/04
(52) U.S. Cl. ............................ 250/227.14; 250/227.16; 385/12
(58) Field of Search .................. 250/227.14, 227.15, 250/227.16, 227.17, 227.18; 73/159, 160, 800, 849; 385/12, 102, 137, 128

(56) References Cited

U.S. PATENT DOCUMENTS

| | | | |
|---|---|---|---|
| 4,581,527 A | | 4/1986 | Crane et al. |
| 4,634,217 A | * | 1/1987 | Levacher .................... 385/102 |
| 4,854,706 A | | 8/1989 | Claus et al. |
| 5,210,499 A | | 5/1993 | Walsh |
| 5,245,180 A | * | 9/1993 | Sirkis ..................... 250/227.16 |
| 5,367,376 A | | 11/1994 | Lagakos et al. |
| 5,399,854 A | * | 3/1995 | Dunphy et al. ......... 250/227.17 |
| 5,591,965 A | | 1/1997 | Udd |
| 5,636,307 A | * | 6/1997 | Cowen et al. ............... 358/102 |
| 5,828,059 A | | 10/1998 | Udd |
| 5,869,835 A | | 2/1999 | Udd |
| 6,047,094 A | * | 4/2000 | Kalamkarov et al. ......... 385/12 |

FOREIGN PATENT DOCUMENTS

JP  63285448  * 11/1988

OTHER PUBLICATIONS

Lawrence, C. M.; Nelson, D. V.; Udd, E.; Bennett, T.; "A Fiber Optic Sensor for Transverse Strain Measurement" Experimental Mechanics, vol. 39 No. 3; Sep. 1999; pp. 203–210.

Schultz, W. L.; Udd, E.; Morrell, M.; Seim. J.: Perez, I.; Trego, A.: "Health monitoring of an adhesive joint using a multi–axis fiber grating strain sensor system"; SPIE, vol. 3586, Jan, 1999; pp. 41–52.

Sirkis, J.S.; Dasgupta, A.: "Optical Fiber/Composite Interaction Mechanics" *Fiber Optic Smart Structures*, Eric Udd, Editor, John Wiley & Sons, Inc.; (1995) Chapter 4, pp. 61–107, ISBN 0–471–55448–0.

* cited by examiner

*Primary Examiner*—Que T. Le
*Assistant Examiner*—Eric J Spears
(74) *Attorney, Agent, or Firm*—Timothy P. Evans

(57) ABSTRACT

A ribbon-like sensor assembly is described wherein a length of an optical fiber embedded within a similar lengths of a prepreg tow. The fiber is "sandwiched" by two layers of the prepreg tow which are merged to form a single consolidated ribbon. The consolidated ribbon achieving a generally uniform distribution of composite filaments near the embedded fiber such that excess resin does not "pool" around the periphery of the embedded fiber.

8 Claims, 3 Drawing Sheets

SENSOR ASSEMBLY

CROSS-REFERENCE TO RELATED APPLICATIONS

The following application for patent is a continuation-in-part of, and claims priority to, co-pending U.S. patent application Ser. No. 09/603,460, filed Jun. 22, 2000.

STATEMENT OF GOVERNMENT INTEREST

The United States Government has rights in this invention pursuant to Contract No. DE-AC04-94AL85000 between the United States Department of Energy and the Sandia Corporation for the operation of the Sandia National Laboratories.

BACKGROUND OF THE INVENTION

1. Field of the Invention

The present invention is related to a fiber sensors uniformly embedded in a composite material such that discontinuities at the fiber/composite material interface are eliminated, or at least greatly minimized. The invention also relates to a sensor which may have a preferred orientation, and to a method for easily identifying that orientation to a user of the sensor. In particular, however, it is anticipated that the invention will find its greatest utility in providing substantially long lengths of a fiber, a wire, or some combination of these, and potentially articles such as silicon chips or another device, in an overlaying member which surrounds the fiber and which is itself easy to fabricate into a mechanical structure.

This invention also relates to a method for placing a fiber, a wire, or some combination of these into a composite material such that resin pooling around the fiber is substantially reduced or eliminated thereby providing a member exhibiting generally uniform properties along a radial direction and along a longitudinal direction with respect to the fiber.

2. Prior Art

There is increasing interest and use of composite materials, for many years. Typically, such composite materials comprise various layers or plies of a fiber, e.g. glass fiber, carbon fiber, or some other fiber, bonded together by a resin or polymer.

For various reasons, composite materials are gaining wide acceptance in many industries where the ability to accurately monitor component structural integrity or surrounding environmental conditions is vital. Furthermore, with the development of fibers having embedded anisotropic mechanical features it is now possible to monitor several physical parameters simultaneously. See U.S. Pat. Nos. 5,828,059 and 5,591,965.

Monitoring techniques have been proposed, using a network of optical fibers embedded into the structure of a component and forming an integral part of it, and such techniques potentially have a number of advantages. In principle, optical fiber sensing technology can be used for a number of purposes: e.g. impact detection and location; delamination and microcrack detection and location; strain and deformation mapping.

It is known to embed optical fibers into a composite material. One proposal can be found in U.S. Pat. No. 4,581,527 (Crane et al) disclosing a damage assessment system using a three-dimensional grid of embedded optical fibers. U.S. Pat. Nos. 4,854,706, 5,210,499 and 5,367,376 discuss embedding optical fibers in resins or resin impregnated tapes. Furthermore, U.S. Pat. No. 4,854,706 discusses orienting the optical fiber within the resin composite. However, none of the references teach a means for consolidating a fiber into a second material such that the fiber is embedded into the matrix of that second material without surrounding areas of discontinuity, such as pockets of resin collecting around the fiber at the fiber/matrix interface.

SUMMARY OF THE INVENTION

What is needed, therefore, is a structure containing a length of the oriented fiber and comprising the same or a similar, compatible prepreg tow composite as the member to which the sensor is to be applied. Also needed is a simple method for producing the desired lengths of tow structure such that no particular care would be required by an assembler to quickly position and "lay up" the tow structure on, or in, the member to which the fiber sensor is to be incorporated.

To address this need, the Applicants herein disclose a method which begins with the device described and disclosed in co-pending U.S. patent application Ser. No. 09/603,460. The utility of that device is now extended to comprehend any fiber incorporated into a second matrix material such that it is consolidated without discontinuities or other non-uniformities along its length. In particular, it is disclosed that a fiber may be laid up in a composite structure such that resin "pooling" at the fiber resin matrix interface is eliminated or substantially reduced.

It is therefore an object of this invention to provide a means for placing an optical fiber into a prepreg tow member which is to be further assembled into a composite structure.

Yet another object of this invention is to provide a method for embedding a fiber within a prepreg tow such that resin is prevented from "pooling" or forming preferentially zones or pockets at the surface of the fiber.

Additional objects and advantages of this invention will become apparent to those skilled in these arts as the following specification and claims is reviewed.

BRIEF DESCRIPTION OF THE DRAWINGS

FIG. 1 schematically illustrates the placement of the fiber into the prepreg tow ribbon.

FIG. 2 is a photomicrograph of a prior art example of resin "pooling" around an optical fiber.

FIG. 3 is a photomicrograph of the present invention showing the absence of resin "pooling" around the sensor.

DETAILED DESCRIPTION OF THE INVENTION

Figure 1:
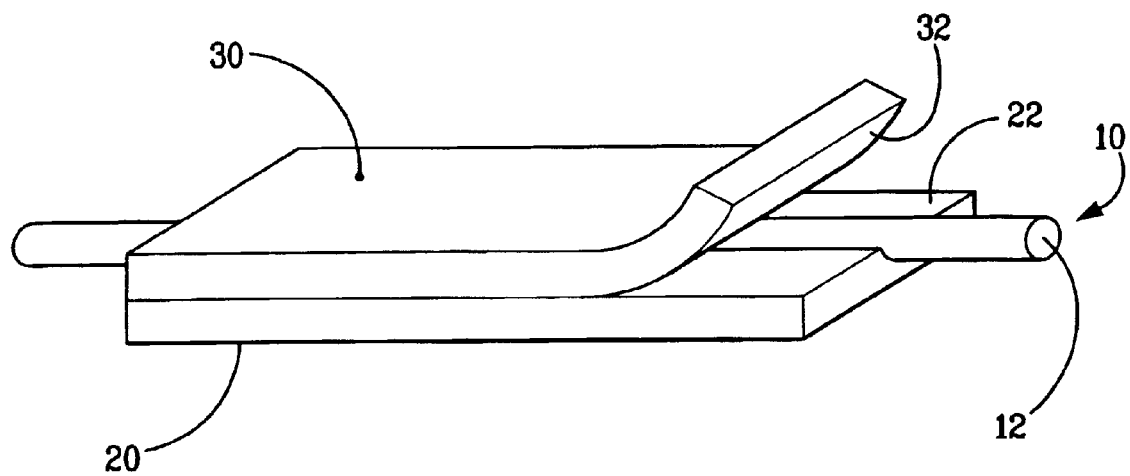
FIGS. 1 through 3, below provide additional description of the instant invention and together with the written description and appended claims constitute the complete description of the instant invention. The attached FIGURES are briefly described as follows.
Figure 1A:
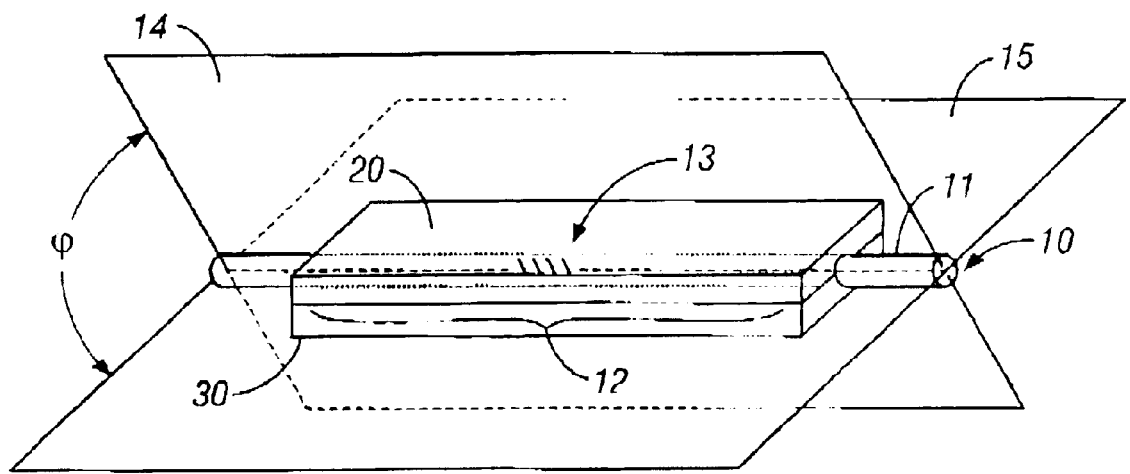
Figure 1B:
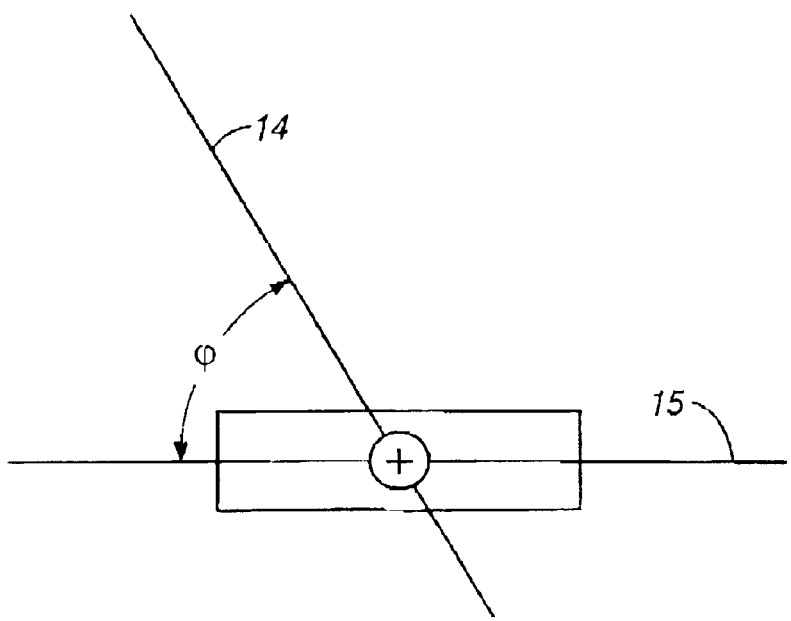

The present invention, described below, teaches a sensor, herein a compound optical fiber, having an oriented sensing means embedded into a continuous length of prepreg tow. The present invention is an extension of the invention described and claimed in co-pending U.S. patent application Ser. No. 09/603,460 file Jun. 22, 2000 and herein incorporated by reference.

Optical fibers are currently used as sensors for detecting a variety of physical parameters. Current technique uses an optical fiber which is either fixedly attached to, or embedded into, a target component, such as an airfoil, so that it cannot move or rotate independently. The optical fiber, therefore, becomes part of the target component and responds as the component responds as it is mechanically loaded.

Unfortunately, it is known that incorporating a fiber or other device in this manner most often results in a significant structural discontinuity along the length of the device as it is consolidated between layers of composite materials. In particular, the resin forming the bulk of the composite materials is known to preferentially pool at the interface of the fiber device and the layers of composite. This pooling can and does introduce significant structural non-uniformities in these systems compromising their performance and behavior.

While the following discussion is drawn to a means for embedding an optical fiber, the invention is not intended to be restricted to optical fibers alone. Any similar narrow gage fiber which can be made to transmit a detectable signal is also intended as part of this disclosure. The fiber may be an optical fiber, an electrically conducting wire, a silicon chip or another device, and fibers having an anisotropic feature where it is desirable to orient the fiber in a preferred direction. The fiber need not have any discernable asymmetry, however, since it is anticipated that the invention will find its greatest utility in providing substantially long lengths of a fiber in an overlaying member which surrounds the fiber and which is easily fabricated into a mechanical structure. It also follows that the sensor of the present invention comprehends spliced fibers made up of one or more individual lengths of fiber such as might occur in a sensor embodied as a "tree" structure comprising multiple branches or comprising more than one sensor means responsive to different stimuli (strain, pressure, temperature, vibration, etc.) and/or providing a different signal response type (optical, electrical, electromagnetic, binary state, etc.).

The following description makes broad use of the terms "prepreg" and "tow" and each is therefore, defined and described as follows. Both terms are terms of art well known to those in the field of fiber reinforced composites. In particular, "prepreg" is known to be, and is intended to mean, any composite filament system comprising a combination of mat, fabric, nonwoven material, or roving which is impregnated with a resin or other matrix material, wherein the matrix material is an essentially homogeneous resin or polymer material in which the filament system of a composite is embedded. Both thermoplastic and thermosetting resins are generally used as matrix materials, although use of metals and ceramics is also known.

Likewise, "tows" are known to be untwisted bundles of continuous filaments, i.e., bundles of reinforcing fibers. The tow is impregnated with a curable polymeric matrix material. A preferred material is tows of man-made fibers such as carbon fibers with a heat-curable epoxy matrix material impregnated therein. Other fiber types such as glass (such as e-glass and s-glass) or aramid fibers, for example, may be used. Any other heat curable matrix material such as any phenolic, vinyl ester, and polyester, or combinations thereof, for example, may also be used. One advantage of the present approach is that it permits great flexibility in the selection of the reinforcing material. A tow designated as "3K" has 3,000 filaments. Such tows are available commercially from various manufacturers.

In the prior invention the sensor orientation was identified by a plurality of structural "tags" attached periodically along the length of the sensor where the tag was placed in a plane which included an axis of the sensor. That is to say, the tag identifies a plane normal to, or at some known angle with, a direction in which the sensing means reaches a maximum response to a stimulus.

In the present invention Applicants teach a sensor and/or a fiber or some other device which is intended to be embedded in a continuous ribbon of prepreg tow in order to provide a fiber, or device, fixed within a structurally uniform article for use in further manufacture. The present invention also contemplates a method for identifying and fixing the orientation of a sensor (in this case a compound optical fiber) wherein the sensor has been constructed to exhibit some form of axial asymmetry. Typically this asymmetry takes the form of a mechanical or structural variation normal to the fiber axis, i.e., the fiber face. In particular, the invention is manifest as a structure comprising a length of oriented fiber surrounded by a planar layer, or "ribbon" of a polymer/reinforcing filament composite, in which the plane of the planar layer is placed in a known orientation with respect to the radial direction of the fiber.

Fiber 10 is shown in FIG. 1 and schematically illustrates the present invention. Shown is a portion of fiber 10 comprising cladding layer 11 (which may be stripped away as necessary), and glass fiber 12, which has a longitudinal axis. In order to provide the embedded fiber a first layer or "ribbon" of prepreg tow 20 is placed on a flat, smooth surface. For handling purposes both sides of tow ribbon 20 are covered with a release layer (not shown) which covers the outer surfaces of the prepreg tow and prevents it from sticking to itself and to other components. The uppermost of the release layers, the layer over the surface on which fiber 10 is to be placed, is removed to expose tacky surface 22. Fiber 10 is then placed onto, and down the middle of, surface 22 in order to fix its position. Tow layer 20 is pre-heated to a temperature of about between 120° F. to about 150° F. before fiber 10 is placed onto first tow layer 20. Once in place fiber 10 is carefully pressed into the thickness of the tow layer. A second tow layer 30, of about equal length as the first tow 20, is then also heated, one of release layers removed, and the exposed tacky surface 32 placed over surface 22 of first prepreg tow 20 to form an extended, composite "ribbon." These two layers are then carefully forced together, in a direction transverse to the fiber axis, under modest pressure, typically just enough to bring the two layers together in order to establish contact between each of them.

This process may repeated in stages along the length of the fiber until a sufficiently long portion has been "laid-up" as would be useful for further processing. The important aspect of this invention are 1.) the fixing of the fiber within a length of the prepreg tow; and 2.) the manner in which the two layers of the composite tow are prepared and brought together around the fiber to form the "ribbon" so as to prevent "pooling" of the polymer adhesive at the fiber surface near the interface between the two layers.

This second aspect of the present invention turns out to have important consequences for this assembly. Because the binder/filament composite is assembled so that its flows around the fiber and merges as a single "block" the filament material is uniformly distributed around the fiber sensor. The fiber embedded in this structure, therefore, "sees" an essentially continuous matrix having substantially the same structural properties over 2 π radians of rotation. The fiber response to transverse strain is therefore expected to be unaffected by irregularities in strain transfer associated with the effects of resin pooling.

Figure 3:
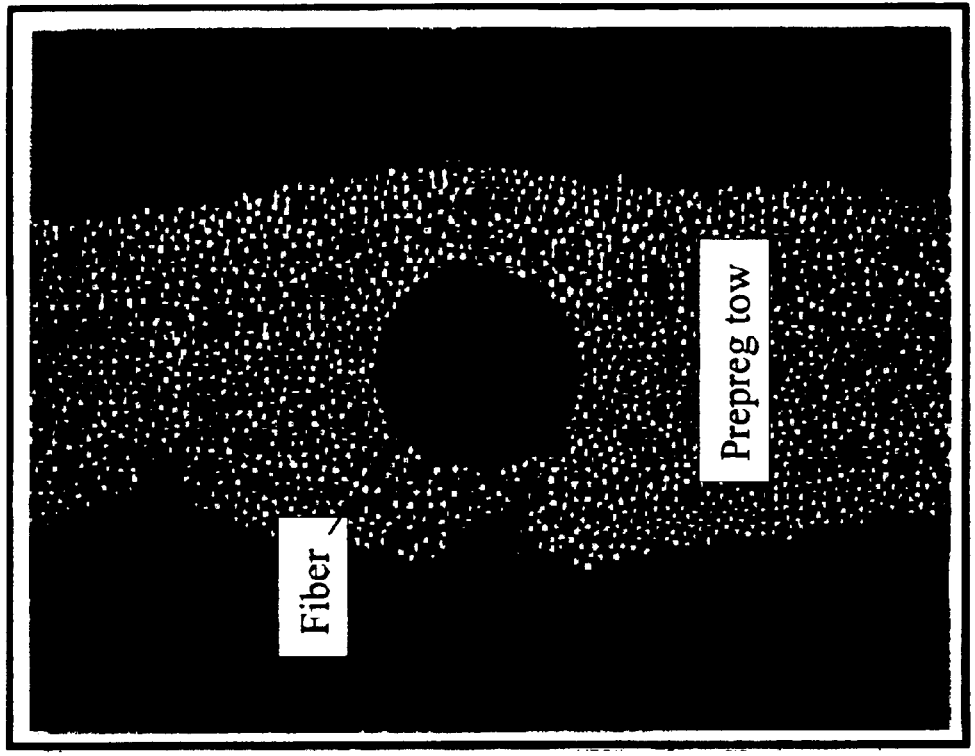
Figure 2:
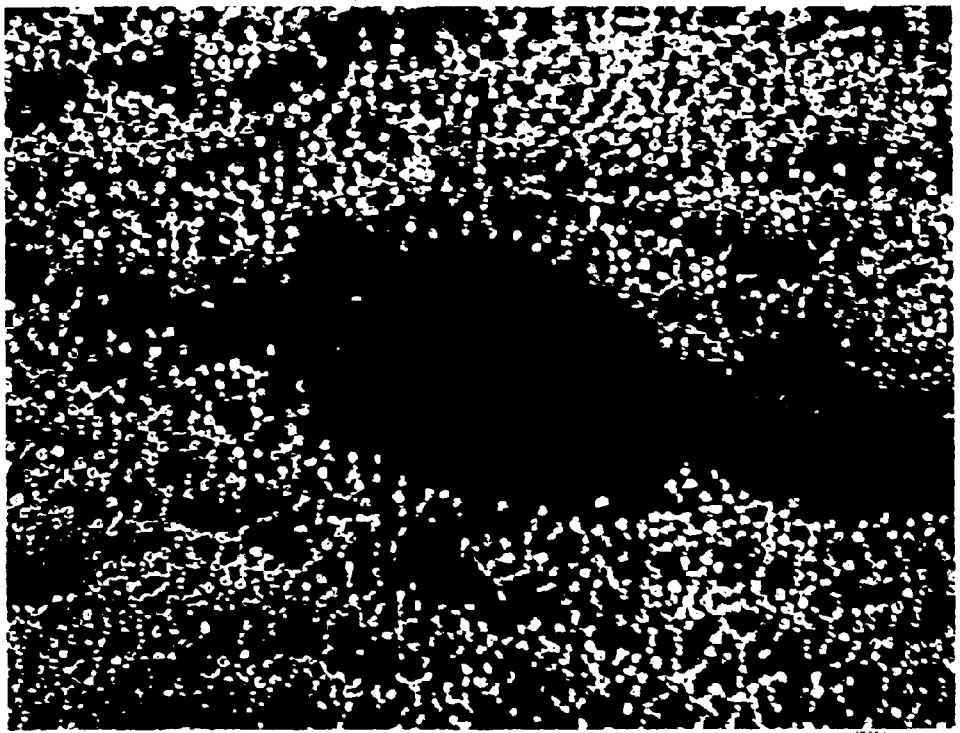

An example of the pooling effect is shown in FIG. 2. This is contrasted in FIG. 3 by the absence of any noticeable pooling in the device of the present invention.

Thus there has been shown and described a novel means for consolidating a fiber or another device into a ribbon of a composite material which fulfill all the objects and advantages sought therefor. Many changes, modifications, alterations and other uses and applications which do not depart from the spirit and scope of the invention are deemed to be covered by the invention which is limited only by the claims that follow.

What is claimed is:

1. A consolidated assembly, comprising;
   a length of fiber; and
   first and second lengths of a prepreg tow, said prepreg tow comprising a plurality of bundles of continuous, untwisted filaments embedded in an impregnating matrix material in an approximately uniform distribution, said first and second lengths disposed opposite one another about said length of fiber with said untwisted filaments aligned about parallel with said length of fiber, wherein said first and second lengths are consolidated to form a single, continuous ribbon surrounding said fiber, wherein the distribution of untwisted filaments adjacent said fiber is everywhere approximately the same as the distribution of filaments distal to said fiber thereby eliminating preferential pooling of said impregnating matrix material adjacent to said length of fiber.

2. The consolidated assembly of claim 1, wherein the fiber is an optical fiber.

3. The consolidated assembly of claim 1, wherein said first length of said prepreg tow comprises a first plane layer, said layer having a first thickness.

4. The consolidated assembly of claim 3, wherein said second length of said prepreg tow comprises a second plane layer having a second thickness, said first and second plane layers sandwiching said fiber sensor.

5. The consolidated assembly of claim 1, wherein the continuous untwisted filaments comprise nonwoven fiber bundles.

6. The consolidated assembly of claim 5, wherein the nonwoven fiber bundles are selected from the list consisting of metals, ceramics, carbon fibers, glass fibers, and aramid fibers.

7. The consolidated assembly of claim 1, wherein the matrix material is selected from the list consisting of a thermoplastic resin, a thermosetting resin, an epoxy, a heat curable polymer, a phenolic, a vinyl ester, a polyester, and combination thereof.

8. The consolidated assembly of claim 4, wherein said first and second layer thicknesses are about equal.

* * * * *